United States Patent
Kawamura et al.

(10) Patent No.: US 10,479,302 B2
(45) Date of Patent: Nov. 19, 2019

(54) IMPACT ABSORBING STRUCTURE OF VEHICLES

(71) Applicant: MAZDA MOTOR CORPORATION, Aki-gun, Hiroshima (JP)

(72) Inventors: Chikara Kawamura, Hiroshima (JP); Taiki Yotsuyanagi, Hiroshima (JP); Hiroaki Takeshita, Hiroshima (JP); Tsuyoshi Nishihara, Hiroshima (JP); Tsuneki Shimanaka, Hiroshima (JP); Takayuki Kimura, Higashihiroshima (JP); Yoshiaki Murakami, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/760,620

(22) PCT Filed: Nov. 8, 2016

(86) PCT No.: PCT/JP2016/083074
§ 371 (c)(1),
(2) Date: Mar. 15, 2018

(87) PCT Pub. No.: WO2017/086204
PCT Pub. Date: May 26, 2017

(65) Prior Publication Data
US 2018/0251088 A1    Sep. 6, 2018

(30) Foreign Application Priority Data

Nov. 20, 2015    (JP) ................................. 2015-227623

(51) Int. Cl.
*B60R 19/34*    (2006.01)
*B62D 21/15*    (2006.01)
(Continued)

(52) U.S. Cl.
CPC .............. *B60R 19/34* (2013.01); *B60R 19/03* (2013.01); *B60R 19/18* (2013.01); *B62D 21/15* (2013.01);
(Continued)

(58) Field of Classification Search
CPC ......... B60R 19/34; B60R 19/03; B60R 19/18; F16F 7/003; F16F 7/12; F16F 7/00; B62D 25/08; B62D 21/15
(Continued)

(56) References Cited

U.S. PATENT DOCUMENTS 9,199,592 B1 * 12/2015 Nusier .................... B60R 19/34
9,598,033 B1 *  3/2017 Berger .................... B60R 19/03
(Continued)

FOREIGN PATENT DOCUMENTS

JP    H06300067 A    10/1994
JP    2009101717 A    5/2009
(Continued)

OTHER PUBLICATIONS

ISA Japan Patent Office, International Search Report Issued in PCT Application No. PCT/JP2016/083074, dated Feb. 7, 2017, WIPO, 2 pages.

*Primary Examiner* — Jason S Morrow
*Assistant Examiner* — E Turner Hicks
(74) *Attorney, Agent, or Firm* — Alleman Hall Creasman & Tuttle LLP

(57) ABSTRACT

An impact absorbing structure includes an impact absorbing member made of CFRP, and the impact absorbing member includes a pair of left and right side wall portions and upper and lower coupling wall portions each coupling the side wall portions. Each of the pair of side wall portions includes a plurality of curved portions. Each of the curved portions is formed such that a leftward/rightward direction depth
(Continued)

thereof decreases toward a front side. Each of the pair of side wall portions includes: a plurality of first carbon fibers arranged to extend in a forward/rearward direction and constituting most of reinforced fibers contained in the side wall portion; and a plurality of second carbon fibers arranged to extend in a direction intersecting with the first carbon fibers. The plurality of second carbon fibers are arranged at both thickness direction end vicinity parts of each of the side wall portions.

7 Claims, 8 Drawing Sheets

(51) Int. Cl.
    *B62D 25/08*     (2006.01)
    *B60R 19/03*     (2006.01)
    *B60R 19/18*     (2006.01)
    *F16F 7/00*     (2006.01)
    *F16F 7/12*     (2006.01)

(52) U.S. Cl.
    CPC .............. *B62D 25/08* (2013.01); *F16F 7/003* (2013.01); *F16F 7/124* (2013.01); *B60R 2019/1806* (2013.01); *B60Y 2304/03* (2013.01); *F16F 2224/0241* (2013.01)

(58) Field of Classification Search
    USPC ..................... 293/120, 132, 133; 296/187.09
    See application file for complete search history.

(56) References Cited

U.S. PATENT DOCUMENTS

| | | | |
|---|---|---|---|
| 2003/0173134 A1* | 9/2003 | Unfried | B60K 5/1216 180/312 |
| 2010/0259033 A1* | 10/2010 | Okabe | B60R 19/34 280/734 |
| 2015/0001866 A1* | 1/2015 | Noyori | B60R 19/34 293/133 |
| 2016/0325701 A1* | 11/2016 | Yabu | B60R 19/03 |
| 2016/0355150 A1* | 12/2016 | Yabu | B60R 19/03 |
| 2017/0217393 A1* | 8/2017 | Mohapatra | B60R 19/34 |
| 2018/0015896 A1* | 1/2018 | Hashimoto | B60R 19/34 |

FOREIGN PATENT DOCUMENTS

| | | |
|---|---|---|
| JP | 2013023162 A | 2/2013 |
| JP | 2015030285 A | 2/2015 |
| JP | 201555271 A | 3/2015 |
| JP | 2017002998 A | 1/2017 |
| WO | 2012029115 A1 | 3/2012 |

\* cited by examiner

IMPACT ABSORBING STRUCTURE OF VEHICLES

TECHNICAL FIELD

The present invention relates to an impact absorbing structure of a vehicle, the impact absorbing structure including an impact absorbing member made of fiber-reinforced resin, the impact absorbing member including a pair of left and right side wall portions arranged at a vehicle body forward/rearward direction tip end-side part of the vehicle, the pair of left and right side wall portions each containing a plurality of reinforced fibers arranged so as to continuously extend in a vehicle body forward/rearward direction.

BACKGROUND ART

A structure has been conventionally known, in which: a pair of left and right front side frames are provided at a vehicle body front portion, or a pair of left and right rear side frames are provided at a vehicle body rear portion; and a bumper beam extending in a vehicle width direction is attached to tip end portions of these side frames through a pair of left and right crash cans (also called crush boxes) capable of absorbing impact energy in collision.

The pair of crash cans are typically molded by a metal material. In vehicle collision, the pair of crash cans cause compression fracture in an axial direction to absorb impact energy transmitted to a vehicle interior.

It is also known that since the crash can is a large component, the crash can is constituted by a fiber-reinforced resin molded body for the purpose of a weight reduction of a vehicle body.

Examples of the reinforced fiber used as a reinforcing member include a glass fiber, a carbon fiber, and a metal fiber. The fiber-reinforced resin is formed by combining the reinforced fibers with a base material (matrix).

According to such fiber-reinforced resin, the reinforced fibers take charge of dynamic characteristics, such as strength, and the base material resin takes charge of a stress transmission function between the fibers and a fiber protection function.

Especially, carbon fiber resin (Carbon-Fiber-Reinforced-Plastic: CFRP) has both high specific strength (strength/specific gravity) and high specific rigidity (rigidity/specific gravity), so to speak, both lightness and strength or rigidity. Therefore, the carbon fiber resin is widely used as a structural material for aircrafts, vehicles, and the like.

An impact energy absorber structure of a vehicle body of PTL 1 includes an impact energy absorber made of fiber-reinforced resin and supported by a front suspension member module provided at a front side of the vehicle interior. The impact energy absorber is formed to have a substantially U-shaped vertical section and integrally includes: a bottom wall portion extending in a forward/rearward direction and a leftward/rightward direction; and left and right vertical wall portions extending upward from both respective left and right end portions of the bottom wall portion. Each of the bottom wall portion and the left and right vertical wall portions is formed in a corrugated plate shape and includes a plurality of concave and convex portions extending in the forward/rearward direction. With this, a difference between a figure center of the impact energy absorber and a height of a floor panel is reduced, and this reduces a bending moment acting on the floor panel.

According to a vehicle body structure of PTL 2, an impact energy absorber made of fiber reinforced plastic and having a square tube shape and an opening direction that is an upper/lower direction is provided at a front surface side of a vehicle body structural body, and a bumper is arranged at a front surface of the impact energy absorber. With this, both the weight reduction and the energy absorbing property are achieved.

Performance required for impact absorbing members such as the crash can is a large energy absorption amount (hereinafter referred to as an EA amount) and a stable absorption of impact energy by progressive fracture in which compression fracture proceeds progressively.

CITATION LIST

Patent Literature

PTL 1: Japanese Laid-Open Patent Application Publication No. 2013-23162

PTL 2: Japanese Laid-Open Patent Application Publication No. 2015-30285

SUMMARY OF INVENTION

Technical Problem

The present applicant has considered a carbon fiber resin structural body capable of causing the progressive fracture in vehicle collision (Japanese Patent Application No. 2015-117520).

The carbon fiber resin structural body considered by the present applicant includes: a plurality of first carbon fiber layers in which carbon fibers are arranged so as to extend in a compressive load input direction; and a plurality of second carbon fiber layers in which carbon fibers are arranged so as to extend and intersect with the carbon fibers of the first carbon fiber layers. One or more second carbon fiber layers in which the carbon fibers extend in a direction intersecting with the compressive load input direction are provided at each of both thickness direction end vicinity parts of a fiber-reinforced resin plate member such that when a compressive load is input, both thickness direction end parts of the fiber-reinforced resin plate member are peeled off via the second carbon fiber layers.

With this, based on the second carbon fiber layers as boundaries, a columnar pillar portion can be formed by the first carbon fiber layers located at a thickness direction inner side of the second carbon fiber layers, and a branched fronds portion can be formed by the first carbon fiber layers located at a thickness direction outer side of the second carbon fiber layers.

According to this carbon fiber resin structural body, the progressive fracture of both thickness direction end portions of the fiber-reinforced resin can be surely and stably caused in vehicle collision, and this can increase the EA amount.

However, when applying this carbon fiber resin structural body to the technology of PTL 1 or 2, there is a possibility that the progressive fracture by the fiber-reinforced resin cannot effectively contribute to the increase in the EA amount.

To be specific, according to the impact absorbing member, when a base end-side part that is a vehicle interior-side end portion is lower in strength than a tip end-side part that is a compressive load input direction-side end portion due to a structural factor, there is a possibility that based on this strength difference, the fracture of the base end-side part starts earlier than the fracture of the tip end-side part in vehicle collision.

When the fracture of the base end-side part of the impact absorbing member starts earlier as above, the fracture of the base end-side part proceeds intensively, and a center axis direction of the impact absorbing member and the compressive load input direction deviate from each other by posture collapse of the impact absorbing member. As a result, the impact absorbing member cannot be completely crushed by the compressive load in collision.

In addition, when the compressive load in collision is input to the impact absorbing member from an oblique direction, the posture collapse of the impact absorbing member occurs. Therefore, a fracture start point cannot be generated at a tip end part of the impact absorbing member, and therefore, the expected EA amount cannot be secured.

To be specific, there is still room for improvement in terms of structure to secure stable EA performance in an impact absorbing structure configured to absorb impact energy by using progressive fracture.

An object of the present invention is to provide, for example, an impact absorbing structure of a vehicle, the impact absorbing structure being capable of securing stable EA performance in vehicle collision.

Solution to Problem

A first aspect of the present invention is an impact absorbing structure of a vehicle, the impact absorbing structure including an impact absorbing member made of fiber-reinforced resin, the impact absorbing member including a pair of left and right side wall portions and a coupling portion coupling the pair of side wall portions, the pair of left and right side wall portions being arranged at a vehicle body forward/rearward direction tip end-side part of the vehicle and each containing a plurality of reinforced fibers arranged so as to continuously extend in a vehicle body forward/rearward direction, wherein: each of the pair of side wall portions includes a plurality of concave and convex portions that are concave and convex in a vertical sectional view perpendicular to the forward/rearward direction; and each of the plurality of concave and convex portions is formed such that a depth thereof in a vehicle width direction decreases toward a tip end portion of the vehicle.

According to the first aspect of the present invention, since the pair of left and right side wall portions contain the plurality of reinforced fibers arranged so as to continuously extend in the vehicle body forward/rearward direction, the impact energy can be absorbed in vehicle collision by using progressive fracture of the pair of left and right side wall portions.

Each of the pair of side wall portions includes the plurality of concave and convex portions that are concave and convex in the vertical sectional view perpendicular to the forward/rearward direction, and each of the plurality of concave and convex portions is formed such that a depth thereof in a vehicle width direction decreases toward the tip end portion of the vehicle. Therefore, in vehicle collision, an input load per unit area of a tip end-side part of each of the side wall portions can be made higher than an input load per unit area of a base end-side part of the side wall portion, and thus, a start point of the progressive fracture can be formed at the tip end portion.

With this, while preventing the posture collapse of the pair of left and right side wall portions, the progressive fracture of the side wall portions can be surely and stably caused from the tip end-side part to the base end-side part, and thus, the impact absorbing member can be completely crushed.

A second aspect of the present invention is configured such that: in the first aspect of the present invention, each of the pair of side wall portions includes a plurality of first reinforced fibers arranged so as to continuously extend in the vehicle body forward/rearward direction and constituting most of the reinforced fibers contained in the side wall portion and a plurality of second reinforced fibers arranged so as to continuously extend in a direction intersecting with the direction in which the first reinforced fibers extend; and the plurality of second reinforced fibers are provided at both thickness direction end vicinity parts of each of the side wall portions.

According to this configuration, the pillar portion formed at each of the pair of side wall portions in the progressive fracture in vehicle collision can be made large, and this can increase the EA performance.

A third aspect of the present invention is configured such that in the second aspect of the present invention, each of the plurality of concave and convex portions is formed in a partial circular-arc shape or a curved shape.

According to this configuration, when the part of the first reinforced fibers corresponding to the fronds portion causes delamination fracture, the second reinforced fibers form a fiber bridge between the first reinforced fibers, so that a tensile load acts on the second reinforced fibers, and cutting energy of the second reinforced fibers can contribute to energy absorbing performance.

A fourth aspect of the present invention is configured such that: in any one of the first to third aspects of the present invention, each of the pair of side wall portions is formed such that an upper-lower width thereof decreases toward the tip end portion of the vehicle; and the plurality of concave and convex portions are provided substantially in parallel with one another in a side view.

According to this configuration, while preventing the posture collapse of the side wall portions, a difference between the input load per unit area of the tip end-side part of the side wall portion and the input load per unit area of the base end-side part of the side wall portion can be increased, and thus, the start point of the progressive fracture can be surely formed at the tip end portion of the side wall portion. In addition, since the input load is input in an axial direction of the reinforced fibers, buckling of the reinforced fibers can be suppressed, and the energy absorbing performance can be increased.

A fifth aspect of the present invention is configured such that in any one of the first to fourth aspects of the present invention, the coupling portion is configured such that a left-right width thereof increases toward a base end portion of the vehicle.

According to this configuration, since the coupling portion supports the side wall portions in vehicle collision, the posture collapse of the side wall portions can be suppressed. Further, in vehicle collision, the input load per unit area of the tip end portion of the coupling portion becomes higher than the input load per unit area of the base end portion of the coupling portion. Therefore, the tip end portion of the side wall portion is not prevented from serving as the start point of the progressive fracture and can be rather caused to serve as the start point of the progressive fracture. Therefore, according to this configuration, the effect of the first aspect of the present invention can be further increased.

Advantageous Effects of Invention

According to the impact absorbing structure of the vehicle of the present invention, the progressive fracture of the pair of left and right side wall portions can proceed from the tip end-side part to the base end-side part in vehicle collision, and this can secure stable EA performance.

DESCRIPTION OF EMBODIMENTS

Figure 1:
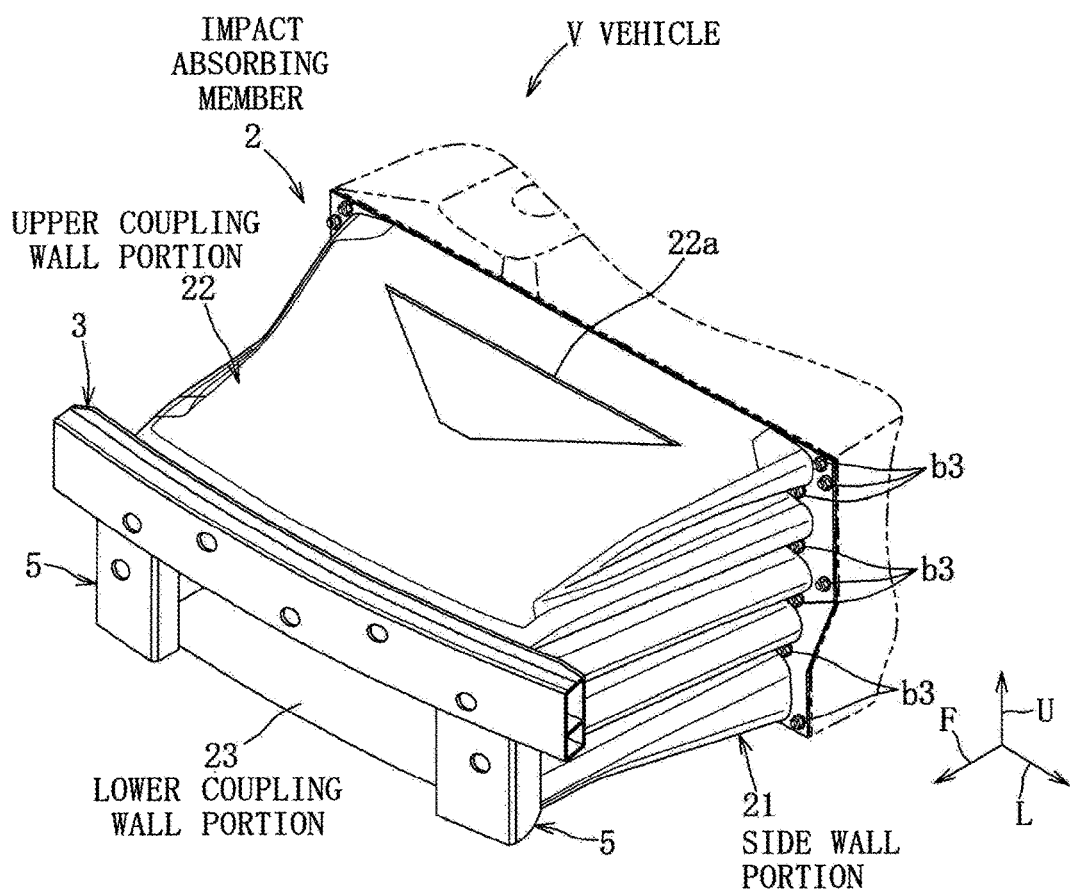
FIG. 1 is a perspective view of a vehicle body front portion of a vehicle including an impact absorbing structure according to Embodiment 1.

Hereinafter, an embodiment of the present invention will be explained in detail based on the drawings.

The following will explain an example in which the present invention is applied to an impact absorbing structure at a vehicle body front portion of a vehicle. The present invention, a product to which the present invention is applied, and applications of the present invention are not limited by the following explanation.

In the drawings, arrows F, L, and U show a front side, a left side, and an upper side, respectively.

Embodiment 1

Hereinafter, Embodiment 1 of the present invention will be explained based on FIGS. 1 to 13.

Figure 2:
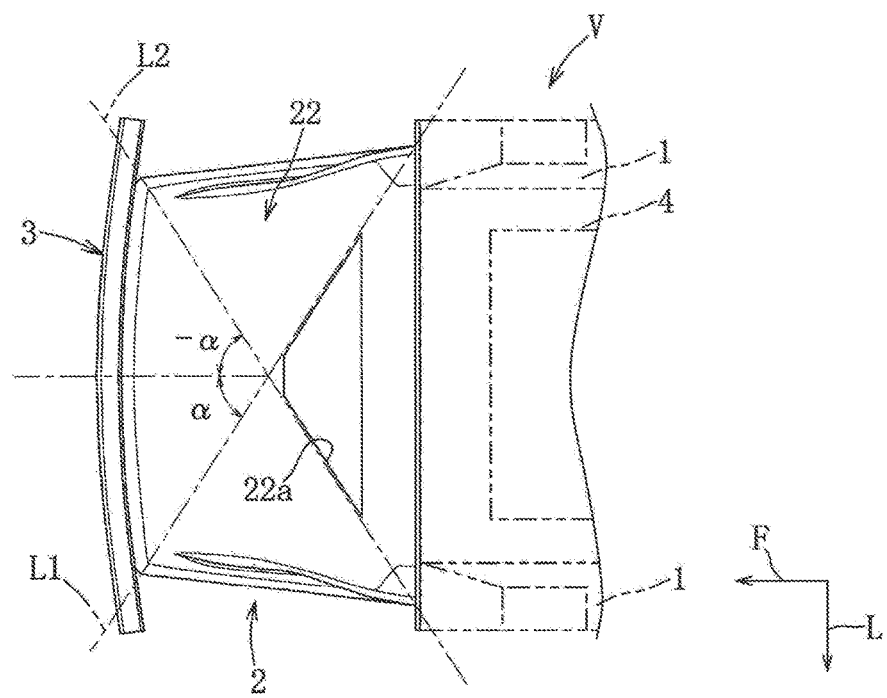
FIG. 2 is a plan view.
Figure 3:
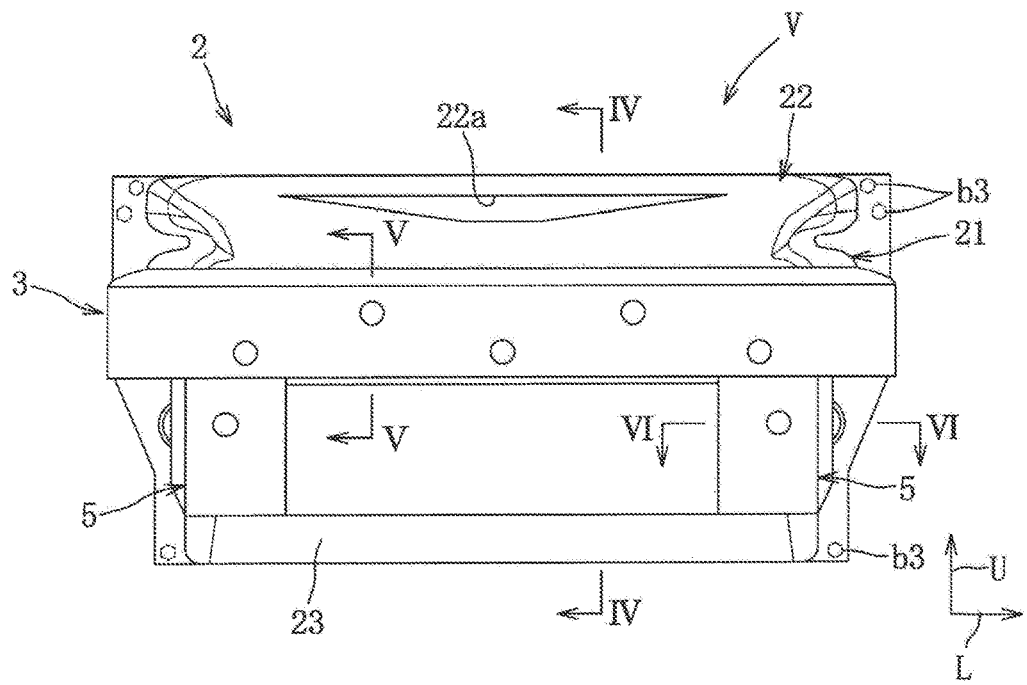
FIG. 3 is a front view.

As shown in FIGS. 1 to 3, a vehicle V includes: a pair of left and right front side frames 1; an impact absorbing member 2 supported by the pair of front side frames 1; a bumper beam (also called a bumper reinforcement) 3 extending in a leftward/rightward direction; and the like.

Each of the pair of front side frames 1 is molded as an integral component by extrusion molding of an aluminum alloy material. The front side frames 1 constitute respective closed sections extending substantially linearly to the front side from respective left and right end portions of a dash panel (not shown) constituting a front wall of a vehicle interior. A power train unit 4 constituted by an engine, a transmission, and the like is mounted between the pair of front side frames 1.

A supporting portion for a front suspension device is formed at midst portions of the pair of front side frames 1, and a fixing portion for the impact absorbing member 2 is formed at front end portions of the pair of front side frames 1 (both the supporting portion and the fixing portion are not shown).

As shown in FIGS. 1 to 5, the bumper beam 3 is formed as an integral component by extrusion molding of an aluminum alloy material. The bumper beam 3 constitutes a pair of upper and lower closed sections extending substantially horizontally in the leftward/rightward direction. In a plan view, the bumper beam 3 is formed in such a gently curved shape that a middle part of the bumper beam 3 projects to the front side.

Figure 5:
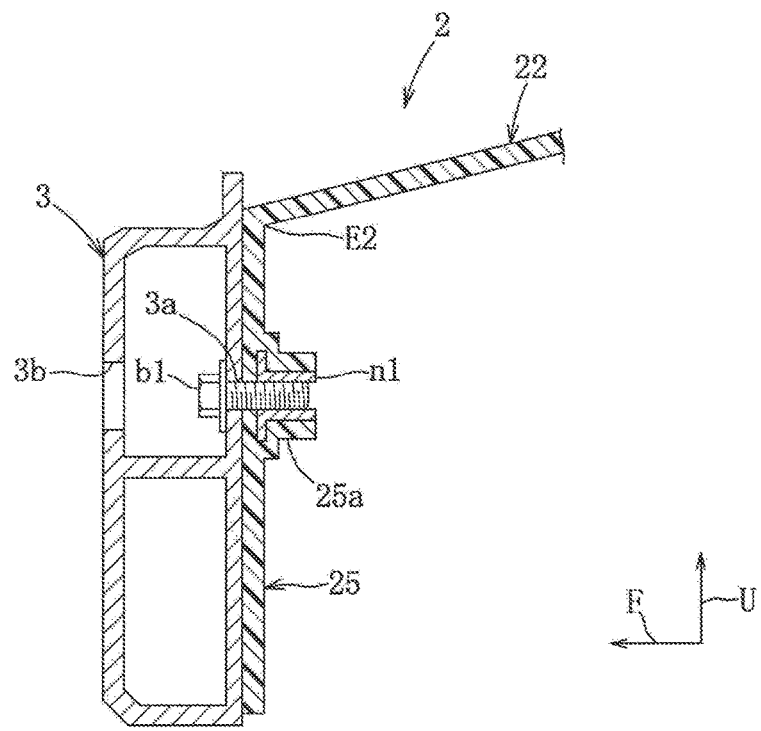
FIG. 5 is a sectional view taken along line V-V of FIG. 3.

As shown in FIG. 5, five bolt holes 3a are formed on a rear wall portion of the bumper beam 3 at regular intervals in the leftward/rightward direction, and five work holes 3b for fastening work are formed on a front wall portion of the bumper beam 3 so as to correspond to the bolt holes 3a. By fastening bolts b1, inserted into the bolt holes 3a, to nuts n1 embedded in the impact absorbing member 2, the bumper beam 3 is equipped on an upper position of a front end portion of the impact absorbing member 2.

The bumper beam 3 couples upper end portions of a pair of left and right load receiving portions 5.

Each of the pair of load receiving portions 5 is molded as an integral component by extrusion molding of an aluminum alloy material. The pair of load receiving portions 5 constitute respective closed sections each having a substantially rectangular shape and extending in an upper/lower direction. The pair of load receiving portions 5 are joined to respective lower portions of both left and right end-side parts of the bumper beam 3 by welding.

Figure 6:
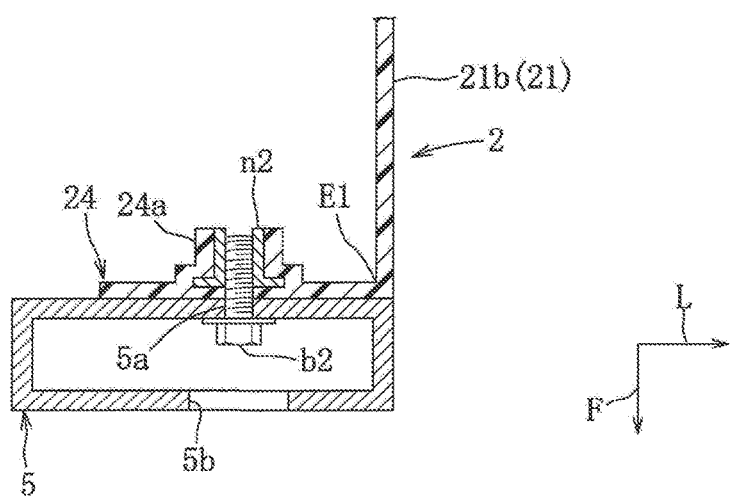
FIG. 6 is a sectional view taken along line VI-VI of FIG. 3.

As shown in FIG. 6, bolt holes 5a are formed on respective middle-stage parts of rear wall portions of the pair of load receiving portions 5, and work holes 5b for fastening work are formed on respective front wall portions of the pair of load receiving portions 5 so as to correspond to the bolt holes 5a, the front wall portions being flush with a front wall portion of the bumper beam 3.

By fastening bolts b2, inserted through the bolt holes 5a, to nuts n2 embedded in the impact absorbing member 2, the pair of load receiving portions 5 are equipped on respective lower positions of the front end portion of the impact absorbing member 2.

Next, the impact absorbing member 2 will be explained.

Figure 7:
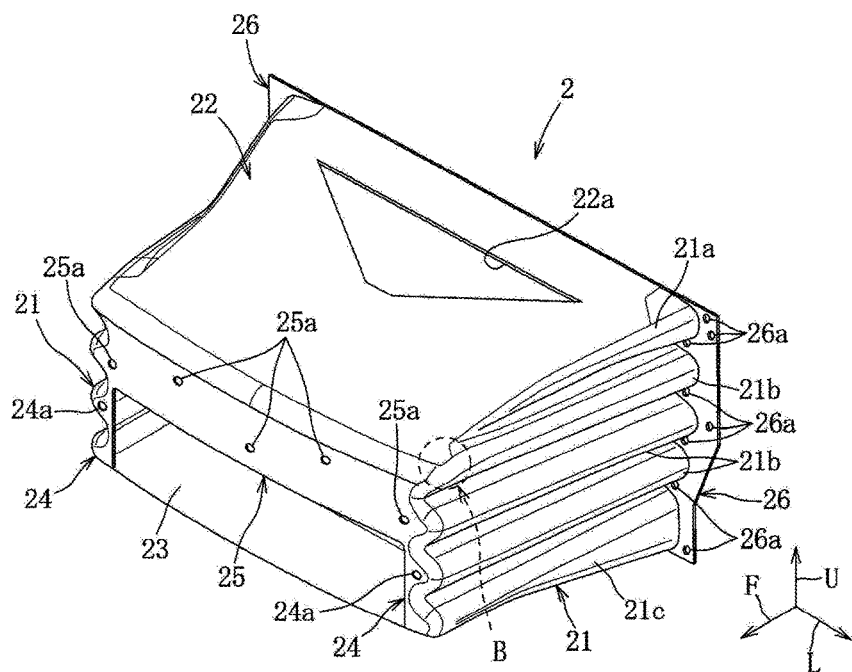
FIG. 7 is a perspective view of the impact absorbing member.
Figure 8:
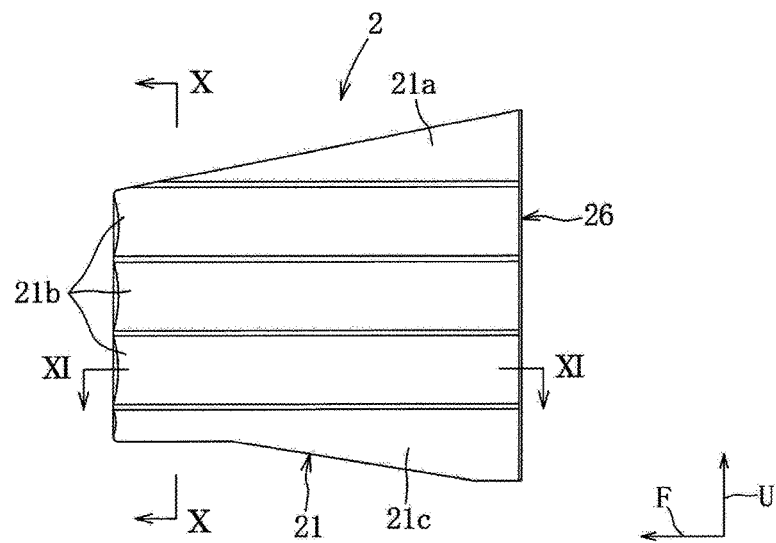
FIG. 8 is a side view.

As shown in FIGS. 1 and 7, the impact absorbing member 2 is fixed to the fixing portion supported by the pair of front side frames 1 and is formed in a substantially box shape whose front and rear end portions are open.

Figure 4:
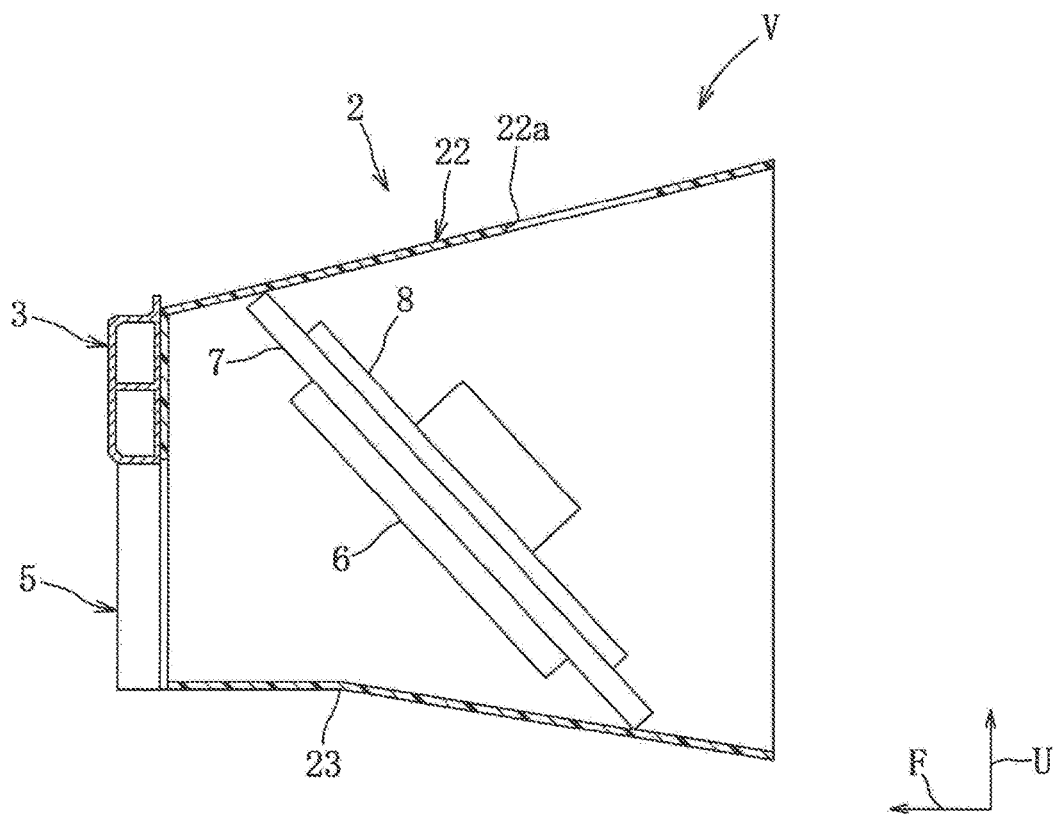
FIG. 4 is a sectional view taken along line IV-IV of FIG. 3.

As shown in FIG. 4, a capacitor 6, a radiator 7, and a cooling fan 8 are mounted in this order from the front side at a forward/rearward direction intermediate portion in the impact absorbing member 2.

Each of the radiator 7 and the like is slanted in such a front-high inclination posture that an upper end portion thereof is located in front of a lower end portion thereof.

It should be noted that the box shape includes such a shape that: at least the front and rear end portions thereof are open; and any one of upper and lower end wall portions is omitted.

The impact absorbing member 2 integrally includes: a pair of left and right side wall portions 21 each having a substantially trapezoidal shape in a side view; an upper coupling wall portion 22 coupling upper end portions of the pair of side wall portions 21 and having a substantially trapezoidal shape in a plan view; a lower coupling wall portion 23 coupling lower end portions of the pair of side wall portions 21 and having a substantially trapezoidal shape in a bottom view; a pair of left and right vertical tip end wall portions 24 extending from respective front end portions of the pair of side wall portions 21 inward in a vehicle width direction; a horizontal tip end wall portion 25 extending downward from a front end portion of the upper coupling wall portion 22; a pair of left and right flange portions 26 extending from respective rear end portions of the pair of side wall portions 21 outward in the vehicle width direction; and the like. The impact absorbing member 2 is integrally formed by molding (for example, RTM) of carbon fiber resin (CFRP) containing carbon fibers that are long fibers as a reinforcing member.

The RTM (Resin Transfer Molding) is a molding method in which: a preform in which carbon fibers are arranged at predetermined orientations (angles) for respective portions of the preform is set in a cavity of a shaping die which is dividable into upper and lower parts; and molten synthetic resin is injected into the cavity.

Each of the pair of left and right side wall portions 21 is formed such that an upper-lower width thereof decreases toward the front side.

Since the pair of side wall portions 21 are laterally symmetrical, the following will mainly explain the left side wall portion 21.

As shown in FIGS. 7 to 11, the side wall portion 21 is formed in a corrugated plate shape including depressions and projections. The side wall portion 21 includes: an upper curved portion 21a having a substantially partial conical shape; three intermediate curved portions 21b lined up in the upper/lower direction and each having a substantially partial cylindrical shape; and a lower curved portion 21c. The upper curved portion 21a arranged so as to extend in a horizontal direction is formed to have a partial circular-arc vertical section perpendicular to the forward/rearward direction, and a diameter of the partial circular-arc vertical section of the upper curved portion 21a increases toward the rear side.

The three intermediate curved portions 21b lined up in the upper/lower direction are continuous with a lower side of the upper curved portion 21a and are arranged so as to extend substantially in parallel with the horizontal direction. Each of the intermediate curved portions 21b is formed to have a partial circular-arc vertical section perpendicular to the forward/rearward direction, and a diameter of the partial circular-arc vertical section of each intermediate curved portion 21b is substantially constant in the forward/rearward direction.

The lower curved portion 21c is continuous with a lower side of the lowest intermediate curved portion 21b and is arranged so as to extend in the horizontal direction. According to the lower curved portion 21c, a part extending from a front end portion to a midst portion has a partial circular-arc vertical section perpendicular to the forward/rearward direction and having a constant diameter, and a part extending from the midst portion to a rear end portion has such a partial circular-arc shape that a diameter thereof increases toward the rear side.

Therefore, the side wall portion 21 is configured such that the upper-lower width thereof increases toward the rear side in a side view.

Figure 11:
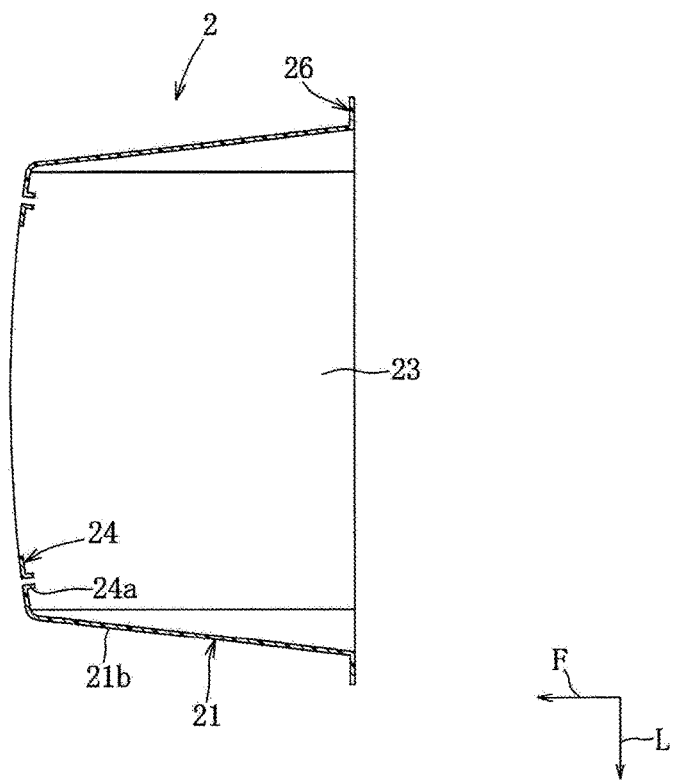
FIG. 11 is a sectional view taken along line XI-XI of FIG. 8.

As shown in FIG. 11, each of the intermediate curved portions 21b is formed such that a depth thereof in the leftward/rightward direction decreases toward the front side. The upper curved portion 21a and the lower curved portion 21c are configured similarly.

With this, without increasing the upper-lower width of the side wall portion 21, in vehicle collision, an input load per unit area of a front end-side part of the side wall portion 21 can be made higher than an input load per unit area of a rear end-side part of the side wall portion 21. Thus, a start point of progressive fracture is surely formed at the front end portion of the side wall portion 21, and the progress of the progressive fracture is stabilized.

The side wall portion 21 includes first carbon fibers C1 and second carbon fibers C2.

The carbon fibers C1 and C2 constituting the side wall portion 21 will be explained.

Figure 12:
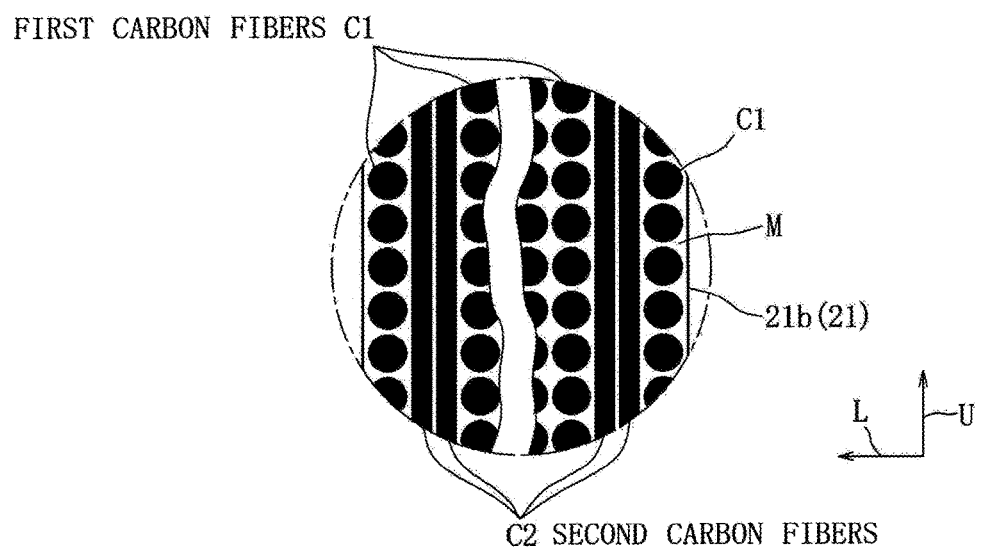
FIG. 12 is an enlarged view of a region A of FIG. 10.

As shown in FIG. 12, each of the first carbon fibers C1 corresponding to most of carbon fibers contained in the side wall portion 21 is constituted by a fiber bundle (tow) obtained by bundling a predetermined number (for example, 12 k) of single fibers (filaments) extending continuously and uniformly in the forward/rearward direction from a front end to rear end of the side wall portion 21 and having so-called an orientation angle of 0° relative to the forward/rearward direction. Each of the second carbon fibers C2 corresponding to some of the carbon fibers contained in the side wall portion 21 is constituted by a fiber bundle obtained by bundling a predetermined number of single fibers extending continuously and uniformly in the upper/lower direction from an upper end to lower end of the side wall portion 21 and having so-called an orientation angle of 90° relative to the forward/rearward direction.

A diameter of the single fiber of the carbon fiber is, for example, 7 to 10 μm, and used as a base material M is thermosetting epoxy synthetic resin.

One layer of the first carbon fibers C1 is arranged at a thickness direction left end of the side wall portion 21, and one layer of the first carbon fibers C1 is arranged at a thickness direction right end of the side wall portion 21. Further, two layers of the second carbon fibers C2 perpendicular to the first carbon fibers C1 are arranged at an inner side of each of the above layers of the first carbon fibers C1.

Then, a plurality of layers of the first carbon fibers C1 are arranged between the left and right second carbon fibers C2.

With this, in vehicle collision, parts corresponding to the first carbon fibers C1 arranged at both respective thickness direction end portions can obtain a function of a fronds portion, and a part corresponding to the first carbon fibers C1 arranged at a thickness direction intermediate part can obtain a function of a pillar portion.

Therefore, when a compressive load acts on the side wall portion 11 in the forward/rearward direction, the parts of the first carbon fibers C1 corresponding to the fronds portion cause delamination fracture prior to the part of the first carbon fibers C1 corresponding to the pillar portion. Then, the part of the first carbon fibers C1 corresponding to the pillar portion causes compression fracture. These delamination fracture and compression fracture progressively proceed rearward from the front end portion (compressive load input-side end portion). Thus, the progressive fracture is caused.

As above, the pillar portion having a large left-right width is stably formed, and thus, a large EA amount is secured.

In addition, when the parts of the first carbon fibers C1 corresponding to the fronds portion cause the delamination fracture, the second carbon fibers C2 form a fiber bridge between the first carbon fibers C1, so that cutting energy of the second carbon fibers C2 is utilized to increase energy absorbing performance.

As shown in FIGS. 1 and 7, the upper coupling wall portion 22 is continuous with upper end portions of the pair of left and right side wall portions 21, and in a plan view, a left-right width of the upper coupling wall portion 22 increases toward the rear side.

An opening portion 22a is formed on the upper coupling wall portion 22.

The opening portion 22a is provided at a leftward/rightward direction intermediate part and forward/rearward direction rear-side part of the upper coupling wall portion 22. In a plan view, the opening portion 22a is formed in a substantially trapezoidal shape whose left-right width increases toward the rear side.

As shown in FIG. 2, a left-side portion of the opening portion 22a is formed substantially in parallel with a diagonal line L2 connecting a front-right corner portion and rear-left corner portion of the upper coupling wall portion 22, and a right-side portion of the opening portion 22a is formed substantially in parallel with a diagonal line L1 connecting a front-left corner portion and rear-right corner portion of the upper coupling wall portion 22.

With this, the number of times of cutting of below-described third and fourth carbon fibers C3 and C4 is suppressed.

As shown in FIG. 4, a front-side portion of the opening portion 22a is located behind the upper end portion of the cooling fan 8 (radiator 7), and a rear-side portion of the opening portion 22a is located behind the lower end portion of the radiator 7. With this, the impact absorbing member 2 obtains an air duct function of supplying air to the radiator 7.

The upper coupling wall portion 22 includes the third carbon fibers C3 and the fourth carbon fibers C4.

The carbon fibers C3 and C4 constituting the upper coupling wall portion 22 will be explained.

The third and fourth carbon fibers C3 and C4 are configured in the same manner as the first and second carbon fibers C1 and C2 regarding the material, the number of bundles, and the like except for an orientation direction. The base material M for the third and fourth carbon fibers C3 and C4 is the same as that for the first and second carbon fibers C1 and C2.

Figure 13:
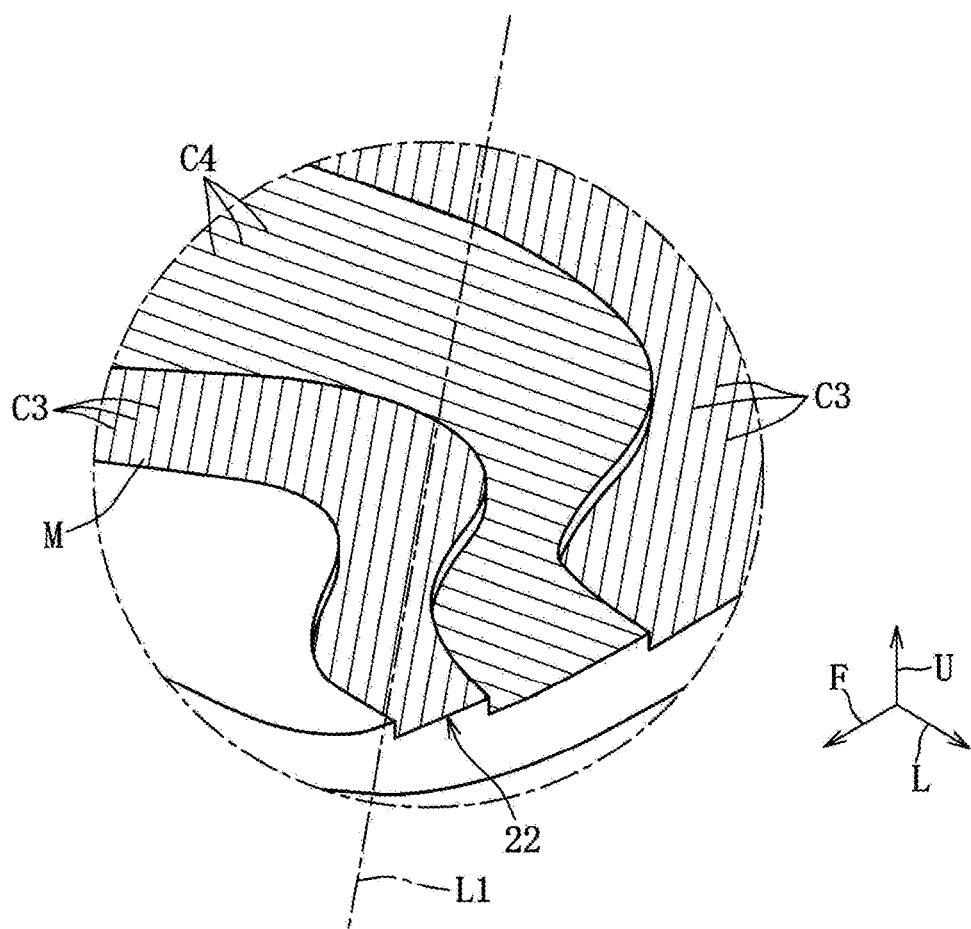
FIG. 13 is an enlarged view of a region B of FIG. 7.

As shown in FIG. 13, each of a plurality of third carbon fibers C3 contained in the upper coupling wall portion 22 is constituted by a fiber bundle obtained by bundling a predetermined number of single fibers extending in parallel with the diagonal line L1 and having so-called an orientation angle of α relative to the forward/rearward direction. Each of a plurality of fourth carbon fibers C4 contained in the upper coupling wall portion 22 is constituted by a fiber bundle obtained by bundling a predetermined number of single fibers extending in parallel with the diagonal line L2 and having so-called an orientation angle of −α relative to the forward/rearward direction.

Layers of the plurality of third carbon fibers C3 and layers of the plurality of fourth carbon fibers C4 are alternately stacked in the upper/lower direction to constitute a mesh structure in which the fibers intersect with each other.

With this, in vehicle collision, the posture collapse of the pair of side wall portions 21 is prevented, and the third and fourth carbon fibers C3 and C4 absorb impact energy applied from oblique directions.

The lower coupling wall portion 23 is continuous with lower end portions of the pair of left and right side wall portions 21, and in a bottom view, the left-right width of the lower coupling wall portion 23 increases toward the rear side.

The lower coupling wall portion 23 includes fifth carbon fibers (not shown).

The fifth carbon fibers are configured in the same manner as the first and second carbon fibers C1 and C2 regarding the material, the number of bundles, and the like except for the orientation direction. The base material for the fifth carbon fibers is the same as that for the first and second carbon fibers C1 and C2.

Each of the plurality of fifth carbon fibers contained in the lower coupling wall portion 23 is constituted by a fiber bundle obtained by bundling a predetermined number of single fibers extending in a direction perpendicular to the forward/rearward direction and having an orientation angle of 90°. Layers of the plurality of fifth carbon fibers are alternately stacked in the upper/lower direction. With this, in vehicle collision, the posture collapse of the pair of side wall portions 21 is prevented, and the fifth carbon fibers absorb impact energy applied from both left and right sides.

As shown in FIG. 7, each of the pair of left and right vertical tip end wall portions 24 is formed so as to extend from the lower end portion to upper end-side portion of the corresponding side wall portion 21 in the upper/lower direction.

Since the pair of vertical tip end wall portions 24 are laterally symmetrical, the following will mainly explain the left vertical tip end wall portion 24.

As shown in FIG. 6, the vertical tip end wall portion 24 extends from the front end-side part of the side wall portion 21 through a first corner portion E1 to the right side, and a right end portion of the vertical tip end wall portion 24 is a free end.

With this, when a compressive load is input to the load receiving portion 5 in the forward/rearward direction, the compressive load intensively acts on the first corner portion E1 that is a boundary between the side wall portion 21 and the vertical tip end wall portion 24. Thus, the fracture start point is generated at the front end portion of the side wall portion 21.

A nut portion 24a is formed at a middle-stage part of the vertical tip end wall portion 24, and a nut n2 is integrally cast on a rear surface of the nut portion 24a. By fastening the bolt b2 to the nut n2, a rear surface of the load receiving portion 5 is brought into surface contact with a front surface of the vertical tip end wall portion 24. Thus, the load receiving portion 5 is attached to the vertical tip end wall portion 24.

In the vertical tip end wall portion 24, the first carbon fibers C1 extend from the front end portion of the side wall portion 21. Therefore, extended parts of the first carbon fibers C1 contained in the vertical tip end wall portion 24 are arranged so as to extend in the leftward/rightward direction.

As shown in FIG. 7, the horizontal tip end wall portion 25 extends in the leftward/rightward direction so as to couple a part extending from an upper end-side portion to upper end portion of the front end portion of the left side wall portion 21 and a part extending from an upper end-side portion to upper end portion of the front end portion of the right side wall portion 21. As with the bumper beam 3, in a plan view, the horizontal tip end wall portion 25 is formed in such a gently curved shape that a middle part of the horizontal tip end wall portion 25 projects to the front side.

As shown in FIG. 5, the horizontal tip end wall portion 25 extends downward from a front end-side part of the upper coupling wall portion 22 through a second corner portion E2, and a lower end portion of the horizontal tip end wall portion 25 is a free end.

With this, when a compressive load is input to the bumper beam 3 in the forward/rearward direction, the compressive load intensively acts on the second corner portion E2 that is a boundary between the upper coupling wall portion 22 and the horizontal tip end wall portion 25. Thus, the fracture start point is generated at the front end portion of the upper coupling wall portion 22. In addition, the compressive load intensively acts on the part extending from the upper end-side portion to upper end portion of the front end portion of each side wall portion 21.

An opening through which traveling wind is introduced into the impact absorbing member 2 is formed between the lower end portion of the horizontal tip end wall portion 25 and a front end portion of the lower coupling wall portion 23.

A nut portion 25a is formed at the horizontal tip end wall portion 25, and five nuts n1 are integrally cast on a rear surface of the nut portion 25a. By fastening the bolts b1 to the nuts n1, a rear surface of the bumper beam 3 is brought into surface contact with a front surface of the horizontal tip end wall portion 25. Thus, the bumper beam 3 is attached to the horizontal tip end wall portion 25. In the horizontal tip end wall portion 25, the first carbon fibers C1 extend from the front end portions of the side wall portions 21. Therefore, extended parts of the first carbon fibers C1 contained in the horizontal tip end wall portion 25 are arranged so as to extend in the leftward/rightward direction.

Figure 9:
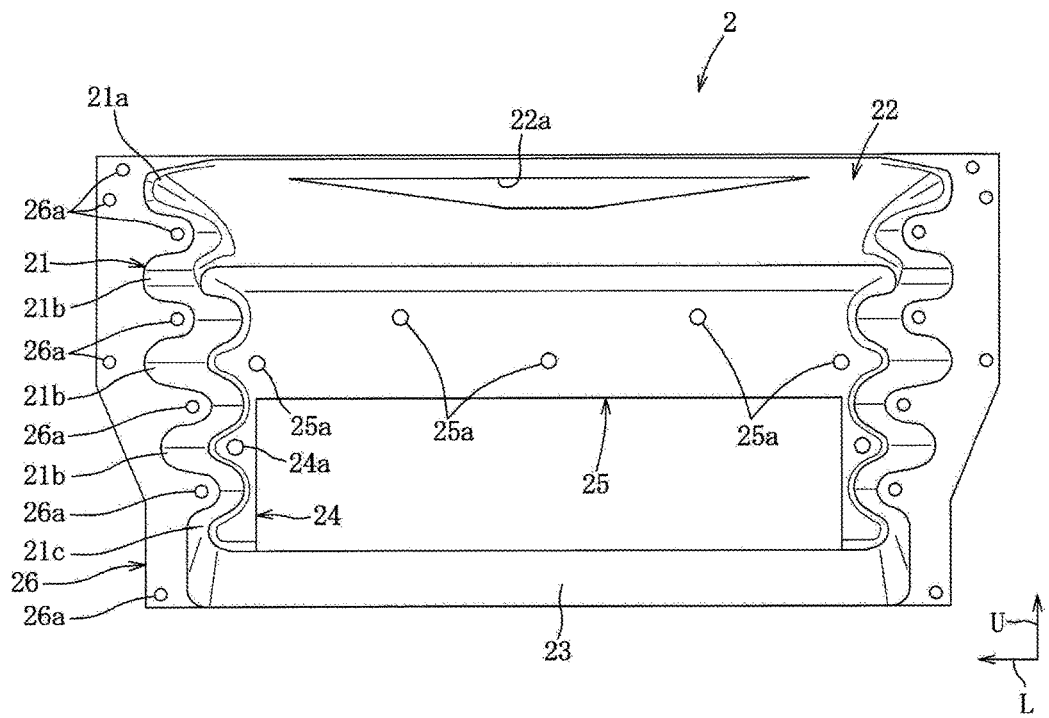
FIG. 9 is a rear view.
Figure 10:
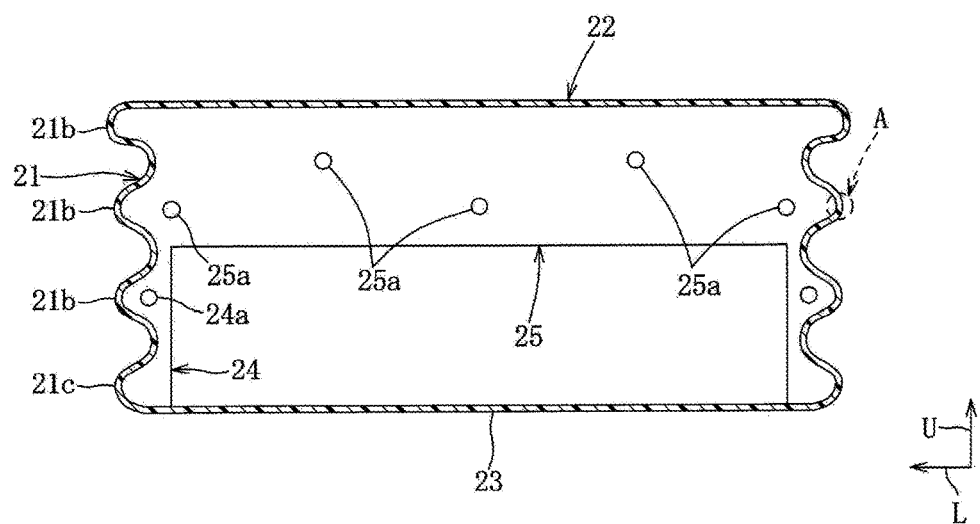
FIG. 10 is a sectional view taken along line X-X of FIG. 8.

As shown in FIG. 9, each of a pair of left and right flange portions 26 is formed so as to extend in the upper/lower direction from a lower end portion to upper end portion of a rear end portion of the side wall portion 21.

Since the pair of flange portions 26 are laterally symmetrical, the following will mainly explain the left flange portion 26.

Eight bolt holes 26a are formed on the flange portion 26.

Each of four out of the eight bolt holes 26a is arranged between the adjacent curved portions (21a, 21b, and 21c) and located at a right end-side part of the flange portion 26, and the remaining four bolt holes 26a are arranged at a left end-side part of the flange portion 26 so as to be lined up in the upper/lower direction. By fastening bolts b3, inserted through the bolt holes 26a, to the fixing portion supported by the front side frames 1, the impact absorbing member 2 is fixed.

Next, actions and effects of the impact absorbing structure of the vehicle V according to the present embodiment will be explained.

According to this impact absorbing structure, since the pair of left and right side wall portions 21 contain the plurality of first carbon fibers C1 arranged so as to continuously extend in the forward/rearward direction, the impact energy can be absorbed in vehicle collision by using the progressive fracture of the pair of left and right side wall portions 21.

Each of the pair of side wall portions 21 includes a plurality of curved portions 21a, 21b, and 21c each having a wave shape in a vertical sectional view perpendicular to the forward/rearward direction, and each of the plurality of curved portions 21a, 21b, and 21c are formed such that a leftward/rightward direction depth thereof decreases toward the front side. Therefore, in vehicle collision, the input load per unit area of the front end-side part of the side wall portion 21 can be made higher than the input load per unit area of the rear end-side part of the side wall portion 21, and thus, the start point of the progressive fracture can be formed at the front end portion of the side wall portion 21.

With this, while preventing the posture collapse of the pair of left and right side wall portions 21, the progressive fracture of the side wall portions 21 can be surely and stably caused from the front end-side part to the rear end-side part, and thus, the impact absorbing member 2 can be completely crushed.

Each of the pair of side wall portions 21 include: a plurality of first carbon fibers C1 arranged so as to continuously extend in the forward/rearward direction and constituting most of reinforced fibers contained in the side wall portion 21; and a plurality of second carbon fibers C2 arranged so as to continuously extend in a direction intersecting with the direction in which the first carbon fibers C1 extend. Further, the plurality of second carbon fibers C2 are arranged at both thickness direction end vicinity parts of the side wall portion 21. Therefore, the pillar portion formed in each of the pair of side wall portions 21 during the progressive fracture in vehicle collision can be made large, and this can increase the EA performance.

Each of the plurality of curved portions 21a, 21b, and 21c is formed in a partial circular-arc shape.

With this, when the part of the first carbon fibers C1 corresponding to the fronds portion causes the delamination fracture, the second carbon fibers C2 form a fiber bridge between the first carbon fibers C1, so that a tensile load acts on the second carbon fibers C2, and cutting energy of the second carbon fibers C2 can contribute to the energy absorbing performance.

Each of the pair of side wall portions 21 is formed such that the upper-lower width thereof decreases toward the front side. Further, the plurality of curved portions 21a, 21b, and 21c are arranged substantially in parallel with one another in a side view.

With this, while preventing the posture collapse of the side wall portions 21, a difference between the input load per unit area of the front end-side part of the side wall portion 21 and the input load per unit area of the rear end-side part of the side wall portion 21 can be increased, and thus, the start point of the progressive fracture can be surely formed at the front end portion of the side wall portion 21. In addition, since the input load is input in an axial direction of the first carbon fibers C1, buckling of the first carbon fibers C1 can be suppressed, and the energy absorbing performance can be increased.

Next, modified examples obtained by partially modifying the above embodiment will be explained.

1) The above embodiment has explained an example of the impact absorbing member provided at the front side. However, the impact absorbing member may be provided at the rear side. In this case, the fixing portion to which the impact absorbing member is attached is formed at rear side frames or a rear end portion of the vehicle interior.

Further, the above embodiment has explained an example in which the fixing portion is formed at the front end portions of the front side frames, and the impact absorbing member is attached to the fixing portion. However, the front side frames may be omitted, and the impact absorbing member may be directly attached to a front end portion of the vehicle interior through the fixing portion.

2) The above embodiment has explained an example in which the upper coupling wall portion coupling the upper end portions of the pair of left and right side wall portions and the lower coupling wall portion coupling the lower end portions of the pair of left and right side wall portions are provided. However, at least one of the coupling wall portions is only required to be provided. Only the upper coupling wall portion may be formed. Further, when only the lower coupling wall portion is formed as the coupling portion, a plurality of third and fourth carbon fibers arranged so as to continuously extend in a direction intersecting with the forward/rearward direction are provided at the lower coupling wall portion. Further, when providing only one of the upper coupling wall portion and the lower coupling wall portion, a member coupling the side wall portions may be arranged instead of the other of the upper coupling wall portion and the lower coupling wall portion.

3) The above embodiment has explained an example in which a plurality of curved portions each having a partial circular-arc section are formed at the side wall portion. However, each the curved portions may have a curved section, or the curved portions may be a plurality of projecting portions each having a rectangular section. Further, the number of curved portions (projecting portions) is not limited to five and may be set to any value.

4) The above embodiment has explained an example in which the horizontal tip end wall portion continuous with the upper coupling wall portion is provided. However, a horizontal tip end wall portion continuous with the lower coupling wall portion may be provided. When providing the horizontal tip end wall portion continuous with the lower coupling wall portion, it is preferable that carbon fibers intersecting with each other in a mesh shape be provided at the lower coupling wall portion.

5) In addition to the above, a skilled person can exploit embodiments obtained by making various modifications to the above embodiment or combining the embodiments within the scope of the present invention, and the present invention contains such modified embodiments.

LIST OF REFERENCE CHARACTERS 2 impact absorbing member
21 side wall portion
21a upper curved portion
21b intermediate curved portion
21c lower curved portion
22 upper coupling wall portion
23 lower coupling wall portion
V vehicle
C1 first carbon fiber
C2 second carbon fiber

The invention claimed is:

1. An impact absorbing structure of a vehicle, the impact absorbing structure comprising an impact absorbing member made of fiber-reinforced resin, the impact absorbing member including a pair of left and right side wall portions and a coupling portion coupling the pair of side wall portions, the pair of left and right side wall portions being arranged at a vehicle body forward/rearward direction tip end-side part of the vehicle and each containing a plurality of reinforced fibers arranged so as to continuously extend in a vehicle body forward/rearward direction, wherein:

each of the pair of side wall portions includes
  a plurality of concave and convex portions that are concave and convex in a vertical sectional view perpendicular to the forward/rearward direction and extend in a horizontal direction,
  a plurality of intermediate curved portions forming at least a part of the concave and convex portions, a bumper reinforcement being attached to tip end portions of the plurality of intermediate curved portions, and
  an upper curved portion continuous with an upper side of the plurality of intermediate curved portions, the upper curved portion having a substantially partial conical shape and a substantially partial circular-arc vertical section perpendicular to the forward/rearward direction;
each of the plurality of concave and convex portions is formed such that a depth thereof in a vehicle width direction decreases toward a tip end portion of the vehicle; and
the upper curved portion is formed such that a diameter thereof increases toward a base end of the upper curved portion.

2. The impact absorbing structure according to claim 1, wherein:
each of the pair of side wall portions includes
  a plurality of first reinforced fibers arranged so as to continuously extend in the vehicle body forward/rearward direction and constituting most of the reinforced fibers contained in the side wall portion, and
  a plurality of second reinforced fibers arranged so as to continuously extend in a direction intersecting with the direction in which the first reinforced fibers extend; and
the plurality of second reinforced fibers are provided at both thickness direction end vicinity parts of each of the side wall portions.

3. The impact absorbing structure according to claim 2, wherein each of the plurality of concave and convex portions is formed in a partial circular-arc shape or a curved shape.

4. The impact absorbing structure according to claim 3, wherein:
each of the pair of side wall portions is formed such that an upper-lower width thereof decreases toward the tip end portion of the vehicle; and
the plurality of concave and convex portions are provided substantially in parallel with one another in a side view.

5. The impact absorbing structure according to claim 4, wherein the coupling portion is configured such that a left-right width thereof increases toward a base end portion of the vehicle.

6. The impact absorbing structure according to claim 1, wherein:
each of the pair of side wall portions is formed such that an upper-lower width thereof decreases toward the tip end portion of the vehicle; and
the plurality of concave and convex portions are provided substantially in parallel with one another in a side view.

7. The impact absorbing structure according to claim 1, wherein the coupling portion is configured such that a left-right width thereof increases toward a base end portion of the vehicle.

* * * * *